United States Patent Office 3,137,624
Patented June 16, 1964

3,137,624
COMPOSITION AND METHOD FOR TREATING DEFECTIVE VEINS
William T. Foley, 120 East End Ave., New York, N.Y.
No Drawing. Filed Feb. 7, 1962, Ser. No. 171,571
6 Claims. (Cl. 167—58)

This invention relates to therapy for the treatment of varicose and other defective or incompetent veins. The invention pertains more particularly to a novel sclerosing solution for treating such veins.

It is an object of the present invention to provide a sclerosing solution which is non-toxic and free of danger of the allergic reactions frequently observed in the use of other sclerosing solutions.

It is a further object of the invention to provide a sclerosing solution which includes an anticoagulant so that the sclerosing agent and the anticoagulant may be applied simultaneously and may act together on the vein tissue. The use of an anticoagulant is indicated to prevent blood clotting such as frequently occurs when sclerosing solutions are injected.

Previously, I developed a method for the treatment of varicose and other defective veins which had as its object to avoid surgery and lengthy hospitalization such as has frequently been required in the past. Case histories are shown in a book entitled Color Atlas and Management of Vascular Disease by William T. Foley and Irving S. Wright, published 1959, by Appleton-Century-Crofts, Inc. The method has been completely depicted in a documentary motion picture film entitled Medifilm Report, Number 3, which was made at the 110th Annual Meeting of the American Medical Association in New York, N.Y. on June 25–30, 1961, and is available through American Medical Association, 535 North Dearborn Street, Chicago 10, Illinois.

In brief, and as applied to the treatment of varicose veins in the leg, for example, the said method comprised emptying the vein to be treated by elevating the leg to empty the vein by gravity using tourniquets at appropriate times, and then injecting an anticoagulant solution, for example, a solution of heparin in water into the empty vein, using a conventional hypodermic needle and syringe. Then, leaving the needle in the vein, the syringe was changed and a sclerosing solution was injected into the vein. For example, solutions of sclerosing agents such as Sylanosol (sodium psylliate), Sotradechol (sodium tetradecyl sulfate), or sodium morrhuate have been used. After one minute, the tourniquets may be removed from the leg and after five minutes the patient may be permitted to stand and walk.

The said method has been quite successful, but has been somewhat awkward and time consuming because of the necessity for successive application of the anticoagulant and sclerosing solutions. That is, it has not been possible to mix the sclerosing solution with the anticoagulant solution because of reactions producing precipitation. Therefore, it has been necessary to inject the solutions separately and to change the syringe during the treatment. Moreover, because of the danger of allergic reactions or toxic effects from the known sclerosing agents, it has been necessary to limit the treatment to one vein at a time.

I have discovered that solutions of sodium chloride in water having a strength of at least 20% (i.e. 20 grams of sodium chloride in sufficient water to make 100 cc. of solution), or preferably greater strength up to a completely saturated solution, provides an excellent sclerosing solution having no toxic effects and no allergic reactions. Moreover, I have discovered that the anticoagulant heparin is miscible in the sodium chloride solution, having no reaction therewith tending to produce precipitation. This makes it possible to add heparin in appropriate strength to the sodium chloride solution and to inject the resulting solution into the defective vein, thus avoiding the necessity for successive injections of anticoagulant and sclerosing solutions. Moreover, it appears that the simultaneous application of the sclerosing agent and the anticoagulant agent in the same solution is more effective than successive applications of two separate solutions. Finally, because of the absence of toxic effects and allergic reactions, several veins may be injected in immediate succession.

The strength of the sodium chloride solution may vary from a minimum of 20% (20 grams of sodium chloride in sufficient water to make 100 cc. of solution) to a completely saturated solution of approximately 35% (35 grams of sodium chloride in sufficient water to make 100 cc. of solution). I prefer, however, to use a saturated or nearly saturated solution. I also prefer to use distilled water in the solution.

To such solution is added sufficient heparin (sometimes referred to as heparin sodium) to provide the desired anticoagulant activity, namely, a minimum of 100 units of anticoagulant activity per 100 cc. of solution. Heparin as available commercially is standardized to possess not less than 100 units of anticoagulant activity per milligram of dry material. I therefore add a minimum of 1 mg. of heparin per 100 cc. of solution, but I prefer to add 3 to 5 mg. of heparin per 100 cc. of solution to insure adequate anticoagulant activity. However, additional heparin may be added if desired, for as much as 10,000 units of anticoagulant activity per 100 cc. of solution may be tolerated with safety.

In the treatment, from 2 to 10 cc. of the above solution is injected, depending on the size of the vein.

The following procedure exemplifies the treatment, according to the present invention, of a patient suffering from varicose veins in the leg.

With the patient seated, a tourniquet is placed around the leg to be treated to trap blood in the veins, making them prominent and easy to enter with a hypodermic needle. The patient then reclines with the foot elevated. The needle of a hypodermic syringe is then inserted into a vein. The tourniquet is then released and the vein is allowed to empty and collapse by gravity. After the vein is collapsed, the tourniquet is again applied at a position and at sufficient pressure to prevent arterial flow into the leg. 2 to 10 cc. of the solution is then injected into the vein, after which the needle may be withdrawn. The tourniquet is left in place for one minute, after which the tourniquet may be removed. A spot dressing is then placed over the needle puncture. After five minutes the patient is allowed to stand and walk.

If it is desired to treat more than one vein, the above described procedure may be repeated immediately, as often as required.

It will be understood that the invention may be variously modified and embodied within the scope of the subjoined claims.

I claim as my invention:

1. The method of treating varicose and other defective veins which comprises emptying a vein of blood by gravity, and thereafter injecting into the empty vein a solution of sodium chloride in water having a strength of at least 20% and containing heparin sufficient to provide at least 100 units of anticoagulant activity per 100 cc. of the solution.

2. The method of treating varicose and other defective veins which comprises emptying a vein of blood by gravity, and thereafter injecting into the empty vein a saturated solution of sodium chloride in water and containing heparin sufficient to provide at least 100 units of anticoagulant activity per 100 cc. of the solution.

3. The method of treating varicose and other defective veins which comprises emptying a vein of blood by gravity, and thereafter injecting into the empty vein a portion of a solution containing at least 20 grams of sodium chloride, and at least 1 milligram of heparin, and sufficient water to make 100 cc. of solution.

4. A solution for injection into varicose and other defective veins comprising a solution of chloride in water having a strength of at least 20% and containing heparin sufficient to provide at least 100 units of anticoagulant activity per 100 cc. of the solution.

5. A solution for injection into varicose and other defective veins comprising a saturated solution of sodium chloride containing heparin sufficient to provide at least 100 units of anticoagulant activity per 100 cc. of the solution.

6. A solution for injecting into varicose and other defective veins comprising at least 20 grams of sodium chloride, and at least 1 milligram of heparin, and sufficient water to make 100 cc. of solution.

References Cited in the file of this patent

Jorpes: Heparin, 1946, Oxford University Press, London, page 179.

New and Nonofficial Drugs (N.N.D.), 1959, J. B. Lippincott Co., Phila., Pa., pages 286, 458 and 459.